United States Patent [19]

Smith, Jr.

[11] 4,220,032
[45] Sep. 2, 1980

[54] POWER PRESS BREAK GUARD

[75] Inventor: Robert A. Smith, Jr., Reidsville, N.C.

[73] Assignee: Air Conditioning Corporation, Greensboro, N.C.

[21] Appl. No.: 969,957

[22] Filed: Dec. 15, 1978

[51] Int. Cl.³ ............................ F16P 3/04; B21D 5/02
[52] U.S. Cl. ........................................ 72/389; 74/615; 100/53; 192/134
[58] Field of Search ................... 72/389, 386; 100/53; 192/134, 133; 74/612, 613, 615

[56] References Cited

U.S. PATENT DOCUMENTS

| | | | |
|---|---|---|---|
| 2,236,730 | 4/1941 | MacBlane | 192/134 |
| 3,186,256 | 6/1965 | Reznick | 74/615 |
| 3,269,215 | 8/1966 | Lindquist | 74/612 |
| 3,913,413 | 10/1975 | Walker | 74/612 |
| 4,131,189 | 12/1978 | Stephens | 192/134 |

Primary Examiner—Francis S. Husar
Assistant Examiner—Gene P. Crosby
Attorney, Agent, or Firm—Lane, Aitken, Ziems, Kice & Kananen

[57] ABSTRACT

A reciprocating preferably transparent break guard is disclosed for use in connection with a reciprocating machine, such as a bending machine. Adjustable switching means are operatively associated with the machine for controlling the actuation of a hydraulic piston connected to a frame for the guard. When the machine is in its upper position for receiving a workpiece, the switching means causes the piston to be actuated to maintain the guard in its upper position free from interference with the break. When the machine is actuated and starts its downward stroke, the switching means actuates a solenoid to release the piston causing the guard to drop smartly in front of the break thereby preventing the operator from accidentally inserting hands or fingers into the break of the machine. In its lowered position, the machine again actuates the switching means to operate the piston to raise the guard to its upper position. The position of the lower edge of the break guard is adjustable relative to a workpiece receiving surface on the machine to admit a workpiece into the break while excluding the hand or finger of the operator from the break.

10 Claims, 5 Drawing Figures

POWER PRESS BREAK GUARD

BACKGROUND OF THE INVENTION

This invention relates to safety equipment for a reciprocating machine. More particularly, this invention relates to a reciprocating safety device reciprocally actuatable in accordance with the raising and lowering of a working portion of the machine. Still more particularly, this invention relates to a transparent safety guard for a bending machine which guard is reciprocally actuatble in cooperation with the machine to lower during the work cycle of the machine to prevent an operator from accidentally inserting hands or fingers into a break in the machine while admitting the workpiece into the break.

Reciprocating cyclic machines, whether manually actuatable or automatically controlled, are well known to the art for performing work functions on a workpiece. Typical of such machines are those which provide for bending, forming, punching, slitting, slicing, or cutting a workpiece, such as a piece of sheet metal. It has long been known in the art to provide a bending machine, for example, which includes a fixed lower die and a movable upper die which travels with a ram for bending a workpiece positioned by a human operator in a break between the dies. Conventionally, such machines are actuated by the operator, often by a foot pedal, in order to free the hands of the operator for guiding and positioning the workpiece according to guide marks at the break in the machine. Conventionally, such machines include a workpiece-receiving surface, such as a table, which is used to guide the sheet metal into the machine to a particular position. Upon actuation of the machine, the movable die is reciprocated to perform the bending function on the positioned sheet metal.

It has been a continuing problem in the art to develop a safety mechanism to prevent a human operator from inserting his hands or fingers into such machinery during the work cycle. Such machines have in the past caused loss of fingers and hands and have presented a safety situation requiring attention.

The problem has become particularly acute because of legislation requiring that machinery of this type protect the operator from the possibility of having his hands in the machine when it is in operation. Accordingly a number of attempts have been made by the art to provide safety equipment. One such attempt has included the effort to utilize an electronic eye apparatus for preventing reciprocal actuation of the machine while the hand of the operator is positioned in the break or at the workpiece receiving in a position where the operator might be injured. Such an apparatus has not worked entirely satisfactorily because of the environment in which such apparatus is used and because such apparatus often needs to be reset causing loss of production while not improving the reliability of the safety feature intended.

Thus, it is an overall object of this invention to provide safety equipment for a reciprocating cyclic machine and particularly for such a machine operated by a human operator.

It is another object of this invention to provide a transparent durable framed safety guard which may be positioned away from or in front of a work-receiving break in a reciprocating machine.

It is another object of this invention to provide a break guard which is free from interference with the break in the equipment when the movable die is at its raised or uplifted position in such an arrangement that the break guard drops and substantially covers the break during the downward or working stroke of the machine.

It is still another object of this invention to provide a break guard of the type described which is reciprocally controlled by a switching circuit operatively associated and movable with the reciprocating portion of the machine.

It is still another object of the invention to provide such a safety guard of the type described at a low cost while yet assuring highly reliable and safe operation.

These and other objects of the invention will become apparent from a review of the accompanying written description of the invention, taken in conjunction with the accompanying drawings.

SUMMARY OF THE INVENTION

Directed to achieving the aforestated objects and overcoming the problems of the prior art, the method and apparatus according to this invention relate to a safety guard for a machine having an actuated reciprocating working member, such as a die, for working a workpiece, such as sheet metal. The machine defines a break for receiving the workpiece in a position to be worked by the working die. The improvement according to the invention includes switching means responsive to a first or upper position of the reciprocating working member at the beginning of the work cycle. Preferably, the switching means includes a switch whose switching action is adjustable to various positions in the stroke of the reciprocating working member to accommodate various thicknesses of workpieces for insertion into the break of the machine.

A reciprocating guard means is positionally controlled by actuating means responsive to the switching means for reciprocally covering a substantial portion of the break while the reciprocating working member is approaching or working the workpiece. By having a free position and an inhibiting position, the reciprocating guard means is thus operative to exclude the insertion of the hands and fingers of the human operator into the break after the working member of the machine has been actuated, but before it contacts the workpiece.

Preferably, the safety guard includes a framed transparent durable plastic member which permits the operator to observe guide marks or positioning indicia on the machine while at the same time affording the safety feature desired. The transparent guard is preferably operatively positioned in a generally U-shaped frame member having the legs of the frame member connected to the working member of a piston. In operation, when the working member of the machine is in its uppermost position and the machine is ready to receive a workpiece on a work-receiving surface, the switching means senses the upper position of the machine and causes the piston to raise or to maintain the guard in a position which is free from interference with the break on the machine.

After the operator has inserted the workpiece into the machine, and has actuated a foot pedal to begin the descent of the working piece of the machine, the switching means responds to the beginning of the downward stroke of the machine and actuates a solenoid valve for promptly releasing the piston actuator to cause the guard to drop rapidly to a position which substantially, if not entirely, covers the break. The positioning of the guard relative to the workpiece-receiving surface is adjustable to accommodate various thicknesses of the workpiece while inhibiting the insertion of the hands or fingers of the operator into the break. The reciprocating cycle of the guard repeats as the machine cycles during its normal operation where the working member actuates the switching means to promptly and efficiently uplift the guard to free the guard from the break for receiving the next workpiece.

DETAILED DESCRIPTION OF THE PREFERRED EMBODIMENT

Figure 1:
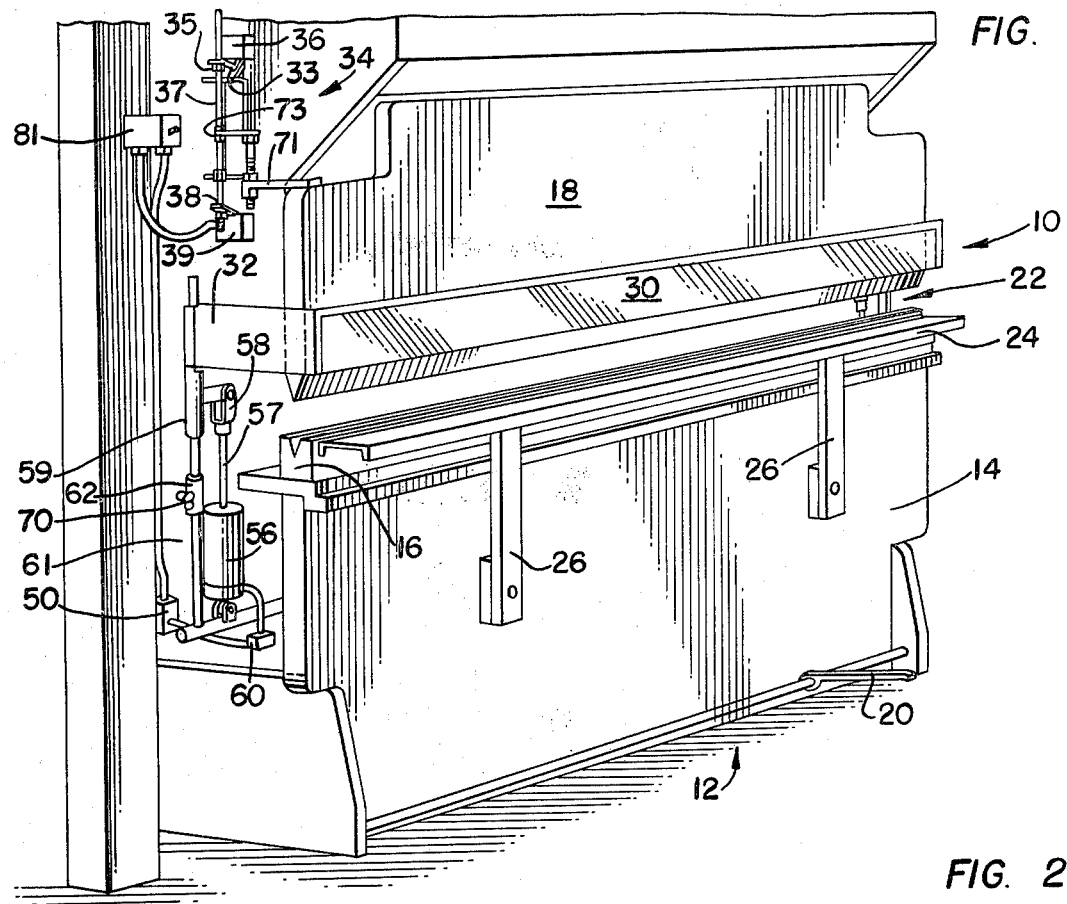
FIG. 1 is a perspective view of a bending machine, partially cut away, showing the reciprocating safety break guard according to the invention in its upper position free from interference with a break in the bending machine, as well as the switching and sensing circuit and the means for actuating the safety guard.
Figure 2:
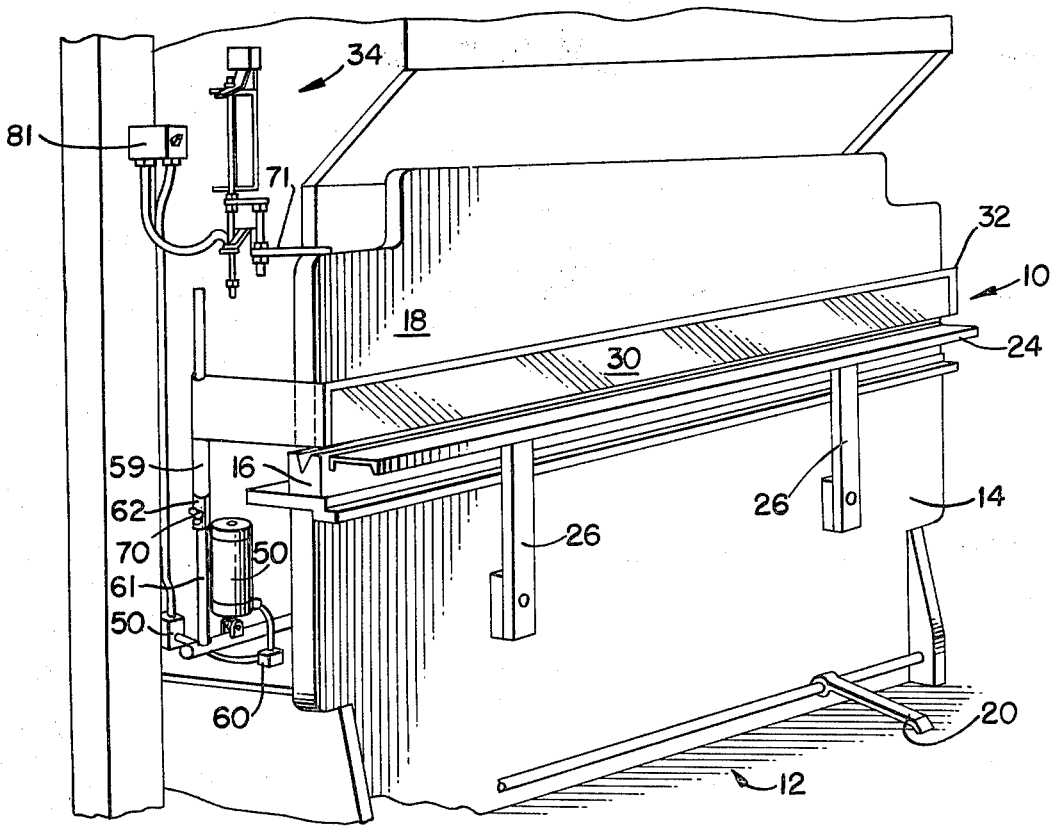
FIG. 2 is a perspective view similar to that shown in FIG. 1 showing the safety break guard in its lowered position where it inhibits the introduction of the hands of the operator while permitting the insertion of the workpiece therein.

As shown in FIGS. 1 and 2, the improved safety guard according to the invention is designated generally by the reference numeral 10 and is operative relative to and in combination with a machine designated generally by the reference numeral 12. The particular machine shown in FIGS. 1 and 2 is a bending machine of the type having a frame 14, a fixed die 16, a reciprocating movable die 18 and means (not shown) for causing the upward and downward movement of the movable die 18 in response to the actuation of the pedal 20 by the foot of the operator. As is well known in the art, the movable die 18 operates upwardly and downwardly in conjunction with a ram for causing the bending of a workpiece positioned in the break, designated generally by the reference numeral 22, between the upper movable die 18 and the lower fixed die 16 when the machine is in its workpiece-receiving position.

The machine 12 includes a workpiece-receiving table 24 secured to the frame by supports 26. In operation, an operator provides a piece of metal 25 (FIG. 4), for example, sheet metal, into a suitable position and orientation on the workpiece-receiving table 24 and inserts it into the break 22 according to positioning marks provided either on the table 24 or on some other suitable location for the guidance of the operator. Actuation of the foot pedal 20 causes the upper die 18 to lower and mesh with the fixed die 16 to cause the desired bending of the material, as representatively shown in FIG. 4.

The improved safety guard 10 includes a transparent durable member 30 extending for the entire length of the die 18 and slightly larger than the length of the break 22. The material 30 is maintained in a generally U-shaped frame 32 preferably made from metal. A switching circuit, designated generally by the reference numeral 34, is provided to sense the position and movement of the upper die 18 and to cause the raising and lowering of the reciprocating guard means 10 as will be discussed. As indicated, the uppermost position of the guard 10 is shown in FIG. 1 while the lowered position of the guard 10 is shown in FIG. 2. In its lowered position, the guard 10 inhibits introduction of fingers or hands into the break 22 while admitting the workpiece 25.

When the ram of the press is in its uppermost position, as shown in FIG. 1, and the die 18 is raised, a contact 33 on the switch 36 is actuated by an adjustable nut 35 on the switch arm 37 to energize the solenoid valve 50 which will open and apply air pressure from an air source 52 through suitable conduits 54 to a piston operator 56. The piston 57 of the of the piston operator 56 has a clevis 58 for receiving reciprocal actuatable idler member 59 for which abuts a leg of the U-shaped frame 32 on the guard 10. This operation causes the guard 10 to raise or be maintained in its uppermost position, as shown in FIG. 1. In such a position, the guard 10 is free from the break 22 and completely out of the way to free the operator to begin his operation.

Figure 4:
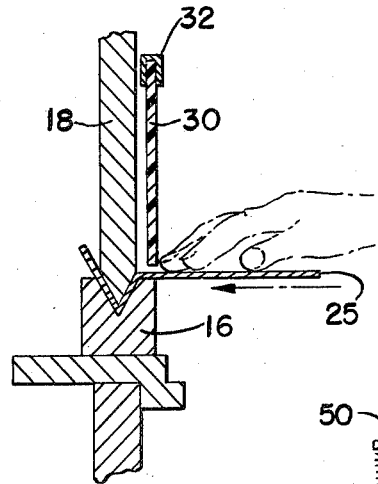
FIG. 4 is a side cross sectional view of a portion of the break guard in its lowered position at the time the working member of the machine is performing work on the workpiece.

When the operator depresses the pedal 20, the ram begins its downward motion causing the downward movement of the die 18. Such action de-energized the switch 36 and relieves the air pressure on the piston operator 56 through the exhaust valve 60 which will cause the guard to drop to its bottommost position as shown in FIG. 2. Preferably, the bottommost position is approximately ¼ inch or so away from the working surface 24 as best seen in FIGS. 2 and 4. This difference is adjustable by loosening the wing nuts 70 to position an adjustable sleeve 62 on a fixed idler member 61 such as to permit the insertion of any thickness of material into the press break but at the same time restrict the fingers of the operator from entering the break. This cooperation is best seen in FIG. 4.

As the ram continues its downward stroke along with the die 18 and reaches its bottom or pending position on the metal (FIG. 4), the mechanism triggers a contact 38 on a switch 39 which will again apply air to the cylinder operator to raise the guard 10 which at this time will be out of the way and not interfere with the bending operation of the metal. At the point that the guard raises up out of the way, there is a slight continued downward movement of the ram when it has traveled far enough so that it would be impossible for an operator to insert his hand between the dies 16 and 18 of the press break.

Figure 3:
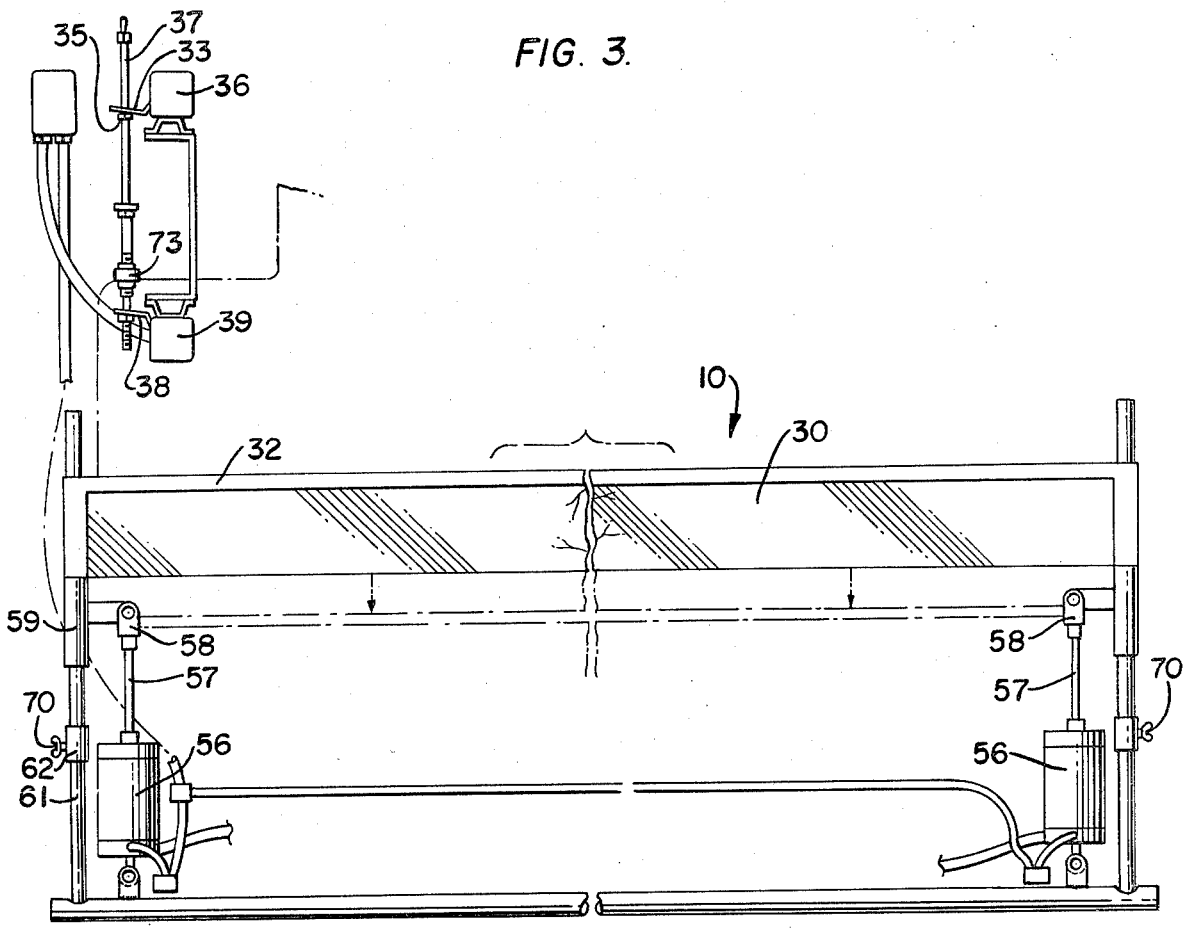
FIG. 3 is a front plan view of the components of the improvement according to the invention.

As best seen in FIGS. 1 and 3, the switch means 34 includes a first member 71 secured to the die 18 for sensing the movement of the die. The member 71 is secured to the rod 37 having adjustable stops 73 thereon so that the operation of the guard can be adjusted with respect to the point at which it begins its upward motion. This is a desirable feature to enable the adjustment for different thickness of the material on different breaks. The members 71 are attached to the die 18 itself by welding and the whole guard assembly slides up and down on fixed idler member 61 with the adjustable sleeve 62 adjusting the position of the guard at its bottommost position.

The apparatus as described above is virtually foolproof and affords the operator a clear view of his working materials as well as safety precaution of the insertion of the hands between the two dies during the downward stroke.

FIG. 3 illustrates the support and reciprocal actuation of each end of the guard by separate piston operators 56, according to the preferred embodiment. By substantially rigidifying the framework, it may be possible to actuate the guard from one end or the other without causing skewing or inhibiting the free reciprocation of the guard. As shown, both operators 56 are operated as has been described.

Figure 5:
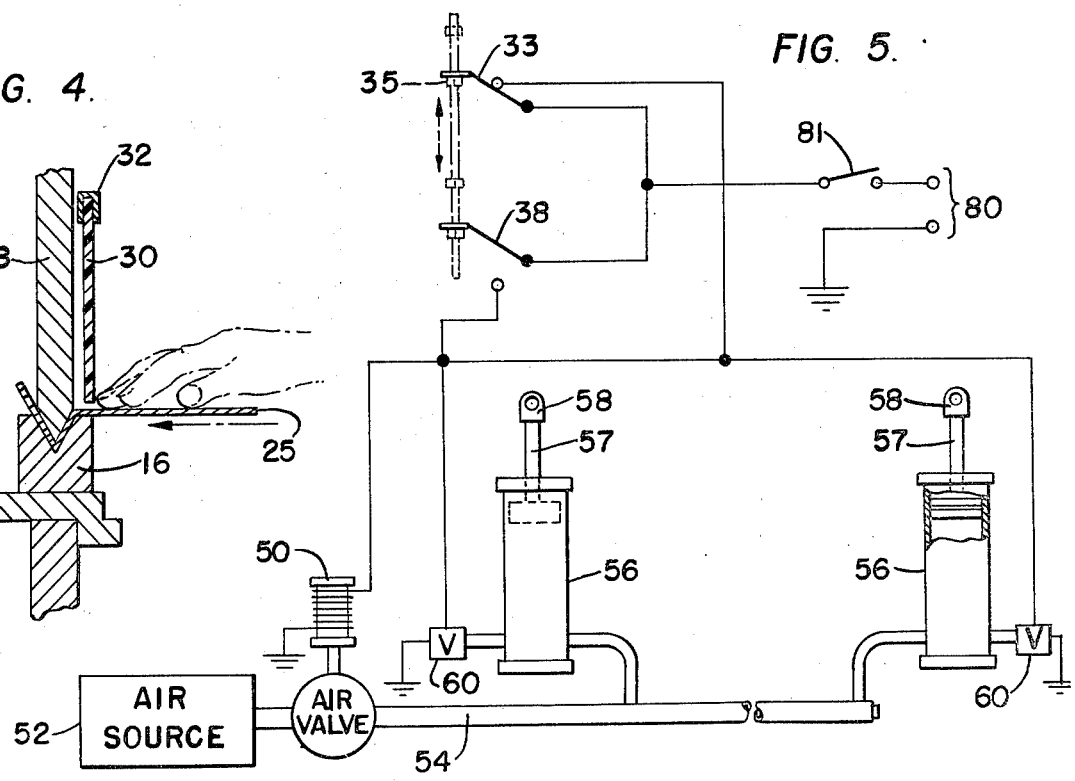
FIG. 5 is an electrical and hydraulic schematic showing an operative circuit for the invention.

FIG. 5 illustrates an electrical schematic wherein like references such as those used in FIGS. 1–4 are also used. The electrical power is supplied from a source 80 and is controlled by a master on-off switch 81.

The invention may be embodied in other specific forms without departing from its spirit or essential characteristics. The present embodiments are, therefore, to be considered in all respects as illustrative and not restrictive, the scope of the invention being indicated by the claims rather than by the foregoing description, and all changes which come within the meaning and range of the equivalents of the claims are therefore intended to be embraced therein.

What is claimed is:

1. In combination with a machine having an actuated reciprocating working member for working a workpiece positioned in a break in said machine for receiving the workpiece, the improvement comprising:
   switching means responsive to the reciprocation of said reciprocating working member;
   reciprocating guard means positionally controlled by actuating means for covering a substantial portion of said break while said reciprocating working member is in a first position relative to said workpiece and uncovering said break while said working member is in a second position relative to said workpiece; and
   actuating means for reciprocally actuating said guard means in response to said switching means, thereby to prevent an operator from inserting a finger into said break in said machine, when said working member is moving from said first position to said second position for working said workpiece.

2. The improvement as set forth in claim 1 wherein said guard means includes a durable, transparent member located relative to said break and a frame for said transparent member, a portion of said frame being connected to said actuating means.

3. The improvement as set forth in claim 2 wherein said frame is generally U-shaped, the legs of said U-shaped frame being connected to said actuating means.

4. The improvement as set forth in claims 1 or 2 wherein said actuating means includes a piston operator having a piston connected through an idler member to said guard means.

5. The improvement as set forth in claim 3 wherein said actuating means includes a pair of piston operators, one of which is respectively connected to each leg of said U-shaped frame, each piston operator having a piston connected through an idler member connected to a leg of said U-shaped member.

6. The improvement as set forth in claim 1 wherein said switch means includes a first switch operative in response to an upper position of said working member for actuating a piston operator when said working member is in its upper position and actuating a relief valve when said working member moves away from its upper position.

7. The improvement as set forth in claim 6 wherein said switch means further includes a second switch operative in response to a lower position of said working member for actuating said piston operator when said working member is in its lower position to raise said guard means away from said break in response thereto.

8. The improvement as set forth in claim 1 further including means for adjusting the lower portion of said guard means relative to said break to permit insertion of a workpiece into said break and inhibiting the insertion of fingers of an operator into said break.

9. The improvement as set forth in claim 1 wherein said machine is a bending machine which includes a fixed die, said working member is a movable die, and a work-receiving surface adjacent said break, said switching means being connected to and actuated by said movable die.

10. A method for inhibiting entry of hands or fingers of an operator into a break for receiving a workpiece in a machine having an actuated reciprocating working member for working a workpiece inserted in said break, the method comprising the steps of:
   maintaining a safety guard in a position free from said break when said working member is in a upper position by sensing said upper position and actuating a piston operator connected to said safety guard in response thereto;
   causing said safety guard to be moved to a position which inhibits entry of hands or fingers of an operator into said break when said working member leaves said upper position by sensing when said working member leaves said upper position and actuating a relief valve operatively connected to said piston operator for causing said safety guard to move to its break-inhibiting position; and
   causing said safety guard to be moved to the position free from said break by sensing a lower position of said working member and actuating said piston operator in response thereto.

* * * * *